United States Patent
Jackson et al.

(10) Patent No.: US 7,172,719 B2
(45) Date of Patent: Feb. 6, 2007

(54) HIGH PURITY SEALING MATERIAL

(75) Inventors: Cory Allen Jackson, Houston, TX (US); Vernon Joe Jackson, Cypress, TX (US)

(73) Assignee: CT Gasket & Polymer Co., Inc., Houston, TX (US)

( * ) Notice: Subject to any disclaimer, the term of this patent is extended or adjusted under 35 U.S.C. 154(b) by 113 days.

(21) Appl. No.: 10/800,597

(22) Filed: Mar. 15, 2004

(65) Prior Publication Data

US 2005/0202230 A1 Sep. 15, 2005

(51) Int. Cl.
*B29C 43/02* (2006.01)
*B29C 43/20* (2006.01)
*B29C 43/52* (2006.01)

(52) U.S. Cl. ..................... 264/321; 264/319

(58) Field of Classification Search .............. 264/321
See application file for complete search history.

(56) References Cited

U.S. PATENT DOCUMENTS

| | | | | |
|---|---|---|---|---|
| 3,944,704 A | * | 3/1976 | Dirks ................ | 428/322.7 |
| 4,692,381 A | * | 9/1987 | Pecsok ................ | 428/375 |
| 4,752,204 A | * | 6/1988 | Kataoka ............... | 425/384 |
| 5,006,602 A | * | 4/1991 | Guerin et al. ......... | 525/72 |
| 5,066,351 A | * | 11/1991 | Knoll ................. | 156/212 |
| 5,137,771 A | | 8/1992 | Lofe et al. | |
| 5,292,780 A | * | 3/1994 | Godfrey et al. ........ | 523/152 |
| 5,459,202 A | | 10/1995 | Martinez et al. | |
| 5,938,878 A | * | 8/1999 | Hurley et al. ......... | 156/219 |
| 5,994,450 A | | 11/1999 | Pearce | |
| 6,120,565 A | * | 9/2000 | Dix et al. ............ | 29/623.1 |
| 6,663,722 B1 | | 12/2003 | Higashino et al. | |
| 6,971,193 B1 | * | 12/2005 | Potter et al. ......... | 36/141 |

FOREIGN PATENT DOCUMENTS

JP 10-007833 * 1/1998

* cited by examiner

*Primary Examiner*—Christina Johnson
*Assistant Examiner*—Monica A Huson
(74) *Attorney, Agent, or Firm*—W. Allen Marcontell

(57) ABSTRACT

Elastomeric sealing elements such as gaskets, O-rings and diaphragms suitable for use as seals in ultra-pure water systems are fabricated from foamed PVDF by compressing foam blanks up to a 5:1 to 7:1 ratio in a heat environment of about 300° F. to about 350° F. The compressed and heated blank is held for a time period sufficient to displace substantially all air from the foam pores and released.

10 Claims, No Drawings

HIGH PURITY SEALING MATERIAL

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to a unique elastomer material having particular utility for gaskets, O-rings, gland packing and similar fluid system sealing applications in highly sensitive facilities such as ultra-pure water and liquid chemical distribution systems.

2. Description of Related Art

Certain manufacturing processes and procedures in the pharmaceutical, integrated circuit and semiconductor production industries require ultra-pure water. Water flow stream contamination due to the presence of suspended particles, ions, metals, total organic carbon and surface roughness (microbe growth) is especially harmful to product quality.

Particles released from wetted polymer components in an ultra-pure water system may contact semiconductor wafers and cause unwanted surface contamination or disrupt photolithography process steps, thereby decreasing yields. Concern for Ionic contamination addresses the reactivity of such pure water. Leached extractives from the wetted system components may have a corrosive or etching effect on semiconductor devices during fabrication that causes failure of the semiconductor device. Evaporation of solutions containing ionics may leave surface residue on the semiconductor device having potential for altering the electrical properties of the device. Metallic contamination of semiconductor devices may also alter the respective electrical properties of a semiconductive device. Total Organic Carbon (TOC) contamination may effect silicon oxidation, etching uniformity and breakdown voltage of semiconductor device gate oxides. Surface roughness may influence microbial proliferation, provide an entrapment area for microcontamination build-up and/or promote shedding of the polymer itself within a distribution system.

Although the term ultra-pure, as applied to water, is imprecise, the semiconductor equipment and material trade association SEMI, has undertaken an effort to define the fluid in terms of a material property specification for materials to be used in wetted contact with an ultra-pure water generation, storage, distribution and transport facility. As presently stated, this specification for polymer material components such as polyvinylidenefluoride (PVDF) is published as SEMI F57-0301. Related standards from ASTM International include ASTM D4327, ASTM D4779 and ASTM D5904. Related ISO standards include ISO 1167 and ISO12162.

The following data tables, published under the SEMI F57-0301 standard, illustrate the extremes of material stability required of materials used to store and distribute ultra-pure water.

TABLE 1

SURFACE EXTRACTABLE IONIC CONTAMINATION

| Element | Static Value @ 85° C. ± 5° C. for 7 days ($\mu g/m^2$) |
|---|---|
| Bromide | $\leq 100$ |
| Chloride | $\leq 3000$ |
| Fluoride | $\leq 60,000$ |
| Nitrate | $\leq 100$ |
| Nitrite | $\leq 100$ |
| Phosphate | $\leq 300$ |
| Sulfate | $\leq 300$ |

TABLE 2

SURFACE EXTRACTABLE METALLIC CONTAMINATION

| Element | Static Value @ 85° C. ± 5° C. for 7 days ($\mu g/m^2$) |
|---|---|
| Aluminum | $\leq 10$ |
| Barium | $\leq 15$ |
| Boron | $\leq 10$ |
| Calcium | $\leq 30$ |
| Chromium | $\leq 1$ |
| Copper | $\leq 15$ |
| Iron | $\leq 5$ |
| Lead | $\leq 1$ |
| Lithium | $\leq 2$ |
| Magnesium | $\leq 5$ |
| Manganese | $\leq 5$ |
| Nickel | $\leq 1$ |
| Potassium | $\leq 15$ |
| Sodium | $\leq 15$ |
| Strontium | $\leq 0.5$ |
| Zinc | $\leq 10$ |

TABLE 3

SURFACE EXTRACTABLE TOTAL ORGANIC CARBON (TOC) CONTAMINATION

| Description | Static Value @ 85° C. ± 5° C. for 7 days ($\mu g/m^2$) |
|---|---|
| TOC | $\leq 60,000$ |

TABLE 4

SURFACE ROUGHNESS REQUIREMENTS

| DESCRIPTION | Ra max. Value |
|---|---|
| Extruded | $\leq 0.25$ ($\leq 10$) μm (μin.) |
| Injection Molded | $\leq 0.38$ ($\leq 15$) μm (μin.) |
| Machined | $\leq 0.62$ ($\leq 25$) μm (μin.) |

Table 5, following, is a typical proprietary standard for extractives leached from component materials proposed for ultra-pure water systems by a 48 hr. exposure to an extraction medium of 2% $HNO_2$ at 68°.

TABLE 5

EXTRACTABLE CONTAMINATION LIMITS

| ELEMENT | EXTRACTION LIMIT $ng/cm_2$ |
|---|---|
| Aluminum | 2.2 |
| Boron | 0.091 |
| Bromine | 4 |
| Calcium | 11.00 |

TABLE 5-continued

EXTRACTABLE CONTAMINATION LIMITS

| ELEMENT | EXTRACTION LIMIT ng/cm$_2$ |
|---|---|
| Chlorine | 21 |
| Chromium | 0.10 |
| Copper | 24.3 |
| Fluoride | 1320 |
| Iron | 3.10 |
| Lead | 1.8 |
| Lithium | <0.0002 |
| Magnesium | 1.4 |
| Manganese | <0.002 |
| Molybdenum | 0.061 |
| Nickel | 0.380 |
| Phosphorous | <4 |
| Potassium | 10.00 |
| Sodium | 10.0 |
| Sulfur | 500 |
| Zinc | 4.00 |

Assembly component joints such as pipe flanges and tank covers for fluid confinement and distribution systems are traditionally sealed by compliant materials such as natural or synthetic rubber. One of the properties of a suitable sealant material is compliance, i.e. a capacity to flow intimately under moderate compressive stress into any voids and surface mismatches in the opposing seal faces of a joint structure.

Another essential property of joint sealants is a stable resilience at the stress displaced position, i.e. a memory of it's unstressed shape or position and maintenance of sufficient biasing force to return to the original shape when the displacement stress is removed.

Other obviously essential joint sealant properties include fluid impermeability and insolvency to the fluid that is confined by the sealant.

It is the combination of these properties, coupled with the highly reactive nature of ultra-pure water, that severely restricts the material options available for sealing joints in an ultra-pure water storage and distribution system.

Materials such as Teflon® have a limited stress memory. Although a Teflon® gasket that is substantially inert to the reactivity of ultra-pure water may have sufficient compliance to initially flow under compressive stress to seal a fluid joint, in time, the Teflon® gasket will dimensionally stabilize (set) at the initially sealed position. Hence, when other components of the system reconfigure due to vibration or temperature change, the Teflon® gasket has no capacity to accommodate the changes. The Teflon® gasket will release the joint seal and allow the confined fluid to escape the closed system.

In an effort to overcome the memory loss characteristic of Teflon®, the prior art has adopted a laminated gasket or seal structure wherein a natural or synthetic rubber core gasket is externally clad by a thin Teflon® overlay. The substantially inert Teflon® outer cladding is wetted directly by the ultra-pure water while the rubber core of the lamination maintains a bias against the Teflon® cladding that is essential to the sealed joint engagement. Although effective, this compound material construction is relatively expensive for a gasket or O-ring.

Although monolithic seals are fabricated from the perfluoroelastomer manufactured by E.I. DuPont de Nemours Co. and marketed under the tradename of Kalrez®, these products are perceived by some to be the source of ultra-pure water contamination in the form of leached carbon compounds, metallics, anion species, water permeation and particles released by mechanical working.

Another elastomeric material that has found some utility as a monolithic sealant in the ultra-pure water industry is Gelastic™. Gelastic™ is published to be the subject of U.S. Pat. No. 5,994,450 and is described by that patent as an A-B-A copolymer that is plasticized by mineral oil or a combination of mineral oil and resin. Distinctively, a Physical Data Sheet published for Gelastic™ to the material an elastic deflection of 2000% and a tensile strength of up to 1600 psi and a 0 compression set at ambient conditions and 500% compression. However, because the material softness is controlled by blended oils, the presence of such oil in the material matrix renders the medium unsuitable for many applications.

The provisions of SEMI bulletin F57-0301 ¶2.6.3 specifically designate high purity grades of perfluoroalkoxy (PFA), polytetrafluoroethylene (PTFE) and polyvinylidene fluoride (PVDF) as preferred materials to be used in contact with ultra-pure water.

Polyvinylidene fluoride (PVDF) is a high-molecular-weight polymer of vinylidene fluoride frequently used in ultra-pure water systems as a rigid or semi-rigid machine component or as a fluid carrier conduit. It is a crystalline material with a melting point of 338° F. and a density of 1.78 g/cc. PVDF has outstanding resistance to most mineral and organic acids aliphatic and aromatic hydrocarbons, alcohols, halogenated solvents, and oxidizing environments. PVDF has greater strength, wear resistance, and creep resistance than PTFE, FEP, and PFA. It resists most chemicals and solvents, including oxidizers such as liquid bromine and bromine salt solutions. PVDF has good weathering resistance, and will not support combustion in air. It has a high dielectric constant (8 to 9) and a high loss factor relative to other fluoroplastics. Typical property values for polyvinylidene fluoride follow in Table 6.

TABLE 6

TYPICAL PVDF PROPERTY VALUES

| Density | 0.064 lb/in$^3$ |
|---|---|
| Specific Gravity | 1.78 |
| Water Absorption, 24 hrs @ 73° F. | <0.04% |
| Tensile strength, Ultimate, @ 73° F. | 7,800 psi |
| Tensile Modulus, 1% sec. @ 73° F. | 348,000 psi |
| Elongation, Ultimate, @ 73° F. | 80% |
| Flexural Strength, @ 73° F. | 10,750 psi |
| Flexural Modulus Tangent, @ 73° F. | 333,500 psi |
| Compressive Strength, @ 73° F. | 11,600 psi |
| Izod Impact Strength, Notched, @ 73° F. | 3 ft-lb/in |
| Rockwell Hardness | R100 |
| Deflection Temp.  @ 66 psi | 300° F. |
| @ 264 psi | 235° F. |
| Melting Point | 352° F. |
| Coefficient of Linear | |
| Thermal Expansion | 7.1 × 10$^5$ in/in-° F. |
| Thermal Conductivity | 1.32 Btu-in/hr-ft$^2$-F |
| Flammability | V-O |
| Volume Resistivity @ 73° F. | 5 × 10$^{14}$ ohm-cm |
| Dielectric Constant | 9 |

The foamed derivative of rigid PVDF, ULTRAFLEX®, has many of the stable characteristics of PVDF desirable in an ultra-pure water system. Furthermore, because of its compliant character, ULTRAFLEX® has some of the characteristics of a desired ultra-pure water system sealant. However, the open-cell structure of ULTRAFLEX® is also highly permeable. High permeability is usually a rejection characteristic for sealant materials.

An object of the present invention, therefore, is a high purity, stable, and thermoformable material having suitable characteristics for a fluid system joint seal in an ultra-pure water system.

Another object of the invention is a consolidated PVDF material having elongation and compression set properties suitable for use in a fluid system joint seal.

Also an object of the invention is a procedure or process for treating foamed PDVF material to convert the foamed PDVF to a consolidated, pliable elastomer having a low compression set characteristic.

BRIEF SUMMARY OF THE INVENTION

These and other objects of the invention as will subsequently become apparent, are attained by the discovery that blank profiles of a product, cut or stamped from a sheet form of foamed PDVF, placed in the mold fixtures of a heated molding press, volumetrically compressed by a ratio value between 5:1 and 7:1 in a thermal environment of 300° F. to 350° F. and held for about 5 to 10 minutes will displace the air from the open-cell matrix of foamed PVDF and consolidate the PVDF material substance into a pliable, resilient elastomer having a low compression set or permeation properties but having considerable elongation and tensile strength properties.

DETAILED DESCRIPTION OF THE INVENTION

The raw material of the present invention is the proprietary, foamed polyvinylidene fluoride (PVDF) material of Atofina Chemicals, Inc. marketed as ULTRAFLEX®. The precursor of ULTRAFLEX® is the Atofina Chemicals, Inc. fluorothermoplastic product offered as KYNAR®. ULTRAFLEX® is an optically opaque, open-celled construction that is foamed from KYNAR® without the use of blowing agents or melt processing.

Characteristically, ULTRAFLEX® PVDF foam material is viscoelastic, breathable and has an open-cell construction. The material is thermoformable, does not support combustion and is chemically stable up to about 250° C. Other characteristics include a substantially uniform cell size of a tailored density and 70% to 90% free volume space (porosity). The material is heat resistant and transparent to UV radiation. The foam matrix of ULTRAFLEX® may be filled to a selectively graduated degree by particulate KYNAR®). The material is produced in a variety of forms and shapes including sheet and rod.

The equipment used to process the present invention for the production of gaskets or O-rings may comprise a traditional elastomer curing/molding press having electronic or oil heated compression platens. Preferably, the machine includes a curing time control program capable of maintaining a product curing temperature of 250° C. to 500° C. for a designated time period. Typically, two-piece product molds that are secured to the press platens may be precision ground stainless steel or TFE coated 4140 steel that is machined to specification.

EXAMPLE

Production of a typical ring gasket for sealing a flanged pipe joint usually comprises a first step of cutting or stamping profile blanks of the gasket product from ULTRAFLEX® foam sheet. One or more sheet blanks are stacked serially in the press mold. The number of blanks stacked in the mold is determined by the thickness of a single, ULTRAFLEX® sheet layer and the desired thickness of the final product. The foam blanks will be compressed by a reduction ratio of approximately 6:1. For product refinement, an optimum ratio may be from about 5:1 to about 7:1. Hence, for a nominal gasket thickness of 0.125 in., an approximately 0.75 in. stack of ULTRAFLEX® foam blank is placed in the press for processing.

As the platens are closed toward the specified volume reduction, which may require approximately 4,000 to 7,000 #/in$^2$ pressure, the material is heated to a range of about 300° F. to about 350° F. Holding time at the predetermined position and temperature is about 5 to 10 minutes. A particular ring gasket of approximately 25.46 in$^2$ was pressed under a load of 150,000 lbs. to a final thickness of about 0.125 in.

Typical ULTRAFLEX® porosity provides a product volume that is about 12% material substance and 88% air. When compressed under heat and pressure, substantially 100% of the air is displaced and the material substance consolidates into a monolithic elastomer having a Shore A Durometer of about 60 to 90. For a starting material of 100% ULTRAFLEX® and 0% particulate KYNAR®, this consolidation is further characterized by an optical transition from the raw material opaque to translucent for the consolidated elastomer product.

Other material properties of consolidated product derived from a 100% ULTRAFLEX® origin, as determined by the ASTM D 2116 test standard, indicate an average tensile strength range of 536.7 psi±1.20 psi within a span of 535.8 psi to 537.5 psi. Elongation of the consolidated product from a 100% ULTRAFLEX® material origin indicates an average of 1649.5%±311.5% within a span of 1429.2% to 1869.7%. The compression set is about 5% at ambient temperature.

Consolidated product derived from ULTRAFLEX® having 33% of it's pore capacity filled with particulate Kynar®, as determined by the ASTM D 2116 test standard, indicates an average tensile strength of 758.3 psi±172.5 psi within a span of 635.4 psi to 880.3 psi. Elongation of the consolidated product of 33% filled ULTRAFLEX® indicates an average of 140.4%±34.7% within a span of 115.9% to 164.9%. The compression set is about 5% at ambient temperature.

Although the present invention has been described in detail with regard to a typical ring gasket, those of ordinary skill in the art will immediately recognize the applicability of the invention principles as described above to the production and use of O-ring seals and for fluid control diaphragms. Diaphragms are fluid-tight membranes that span a chamber to separate a pressure differential within the chamber. Diaphragms may be used as motors or as pumps in lieu of pistons. Hence, the product may be very useful as the membrane element of a diaphragm pump or diaphragm valve.

Those of ordinary skill in the art will also understand that the foregoing invention examples are described for the purpose of merely illustrating the preferred embodiments of the invention and are not to be interpreted restrictively or as a limit of use or application of the invention. The spirit and scope of the invention is found from the following claims.

The invention claimed is:

1. A method of forming a consolidated PVDF elastomer product comprising the steps of:
   (a) forming a product blank profile from a PVDF foam;
   (b) placing said product blank profile in a mold between platens of a heated molding press;

(c) volumetrically compressing said product-blank profile between said platens by a ratio of 5:1 to 7:1 while heating said blank between 300° F. and 350° F.; and, (d) holding said compressed and heated product blank profile for a time sufficient to displace substantially all air from said PVDF foam.

2. A method as described by claim 1 wherein said product blank profile comprises a serially stacked plurality of PVDF foam sheets.

3. A method as described by claim 2 wherein said product blank profile is held in a compressed and heated state for 5 to 10 minutes.

4. A method of manufacturing a sealing element for fluid system joints comprising the steps of:

(a) forming a blank profile of a fluid system sealing element from PVDF foam.

(b) placing said blank profile between platens of a heated molding press:

(c) compressing said blank profile by a ratio of between 5:1 and 7:1.

(d) heating said compressed blank profile between 300° F.; and 350F; and, (e) holding said blank profile in said compressed and heated state for a time period to displace substantially all air from said foam.

5. A method of manufacturing a sealing element as described by claim 4 wherein said sealing element blank profile is formed from a plurality of PVDF foam sheets.

6. A method of manufacturing a sealing element as described by claim 4 wherein said blank profile is held in a compressed and heated state for 5–10 minutes.

7. A method of forming a monolithic PVDF elastomer comprising the steps of:

(a) placing a PVDF foam form in a mold between platens of a heated molding press:

(b) volumetrically compressing said foam form between said platens by a ratio of 5:1 to 7:1 while heating said foam form between 300° F. and 350° F.; and, (c) holding said compressed and heated foam form for a time sufficient to transform said foam form to a consolidated elastomer having a Shore A Durometer of about 60 to 90.

8. A method as described by claim 7 wherein said PVDF foam form comprises a substantially free volume space of 70% to 90%.

9. A method as described by claim 7 wherein said foam form is transformed to a translucent elastomer.

10. A method as described by claim 7 wherein said foam form is transformed to an elastomer having an elongation property of about 1,429% to about 1,869%.

* * * * *